(12) United States Patent
Zheng et al.

(10) Patent No.: US 9,334,924 B2
(45) Date of Patent: May 10, 2016

(54) CABLE POSITIONING APPARATUS

(71) Applicant: Huawei Technologies Co., Ltd., Shenzhen, Guangdong (CN)

(72) Inventors: Huaming Zheng, Shenzhen (CN); Chunbo Zhao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/278,057

(22) Filed: May 15, 2014

(65) Prior Publication Data
US 2014/0245573 A1     Sep. 4, 2014

Related U.S. Application Data

(63) Continuation of application No. PCT/CN2012/084680, filed on Nov. 15, 2012.

(30) Foreign Application Priority Data

Nov. 15, 2011   (CN) .......................... 2011 1 0361169

(51) Int. Cl.
*F16G 11/02*     (2006.01)
*H02G 3/30*      (2006.01)

(52) U.S. Cl.
CPC .................. *F16G 11/02* (2013.01); *H02G 3/30* (2013.01); *Y10T 24/1484* (2015.01)

(58) Field of Classification Search
CPC ....... F16G 11/00; F16G 11/02; F16G 11/025; F16G 11/03; F16G 11/04; H02G 3/30; Y10T 24/1484; Y10S 292/37

USPC .............. 248/58, 62, 65, 68.1, 73, 74.1, 74.2, 248/74.4, 49, 220.21, 222.11, 222.12, 248/300–307; 292/137, 138, 145, 163, 164, 292/177, 174; 403/325–328; 312/319.1
See application file for complete search history.

(56) References Cited

U.S. PATENT DOCUMENTS

| | | | | |
|---|---|---|---|---|
| 1,781,991 A | * | 11/1930 | Stover | ............................. 223/88 |
| 2,082,099 A | * | 6/1937 | Cruser | ............................. 248/49 |
| 2,692,054 A | * | 10/1954 | Berglund | ................. 211/106.01 |
| 3,515,363 A | | 6/1970 | Fisher | |
| 3,640,497 A | * | 2/1972 | Waki | ........................ 248/220.41 |
| 3,721,412 A | * | 3/1973 | Kindorf | ........................... 248/73 |
| 3,815,756 A | * | 6/1974 | Cox | ............................. 211/57.1 |

(Continued)

FOREIGN PATENT DOCUMENTS

| CN | 2302382 Y | 12/1998 |
|---|---|---|
| CN | 2485844 Y | 4/2002 |

(Continued)

*Primary Examiner* — Nkeisha Smith

(57) ABSTRACT

The present invention discloses a cable positioning apparatus, including a base, a snap-fitting apparatus, and a cable clamp. The base includes a front side, a rear side opposite to the front side, and an end face connecting the front side and the rear side. The snap-fitting apparatus is arranged on the rear side of the base, and the snap-fitting apparatus includes a lock, where the lock is configured to retract to insert into a corresponding installation hole when external force is applied, and restore, when the external force is removed, to an initial position to be locked into the installation hole. Using the apparatuses according to the present invention, a cable is limited without using any other tool, thereby greatly reducing the time spent laying out and positioning a high density of cables.

11 Claims, 5 Drawing Sheets

(56) References Cited

U.S. PATENT DOCUMENTS

| | | | |
|---|---|---|---|
| 3,939,985 A * | 2/1976 | Hochman | 248/220.22 |
| 4,023,758 A * | 5/1977 | Yuda | 248/73 |
| 4,114,763 A * | 9/1978 | Hochman | 211/57.1 |
| 4,337,934 A * | 7/1982 | Caveney | 269/77 |
| 4,366,906 A * | 1/1983 | Joyce | 211/59.1 |
| 4,871,135 A * | 10/1989 | Thalenfeld | 248/220.22 |
| 4,918,261 A | 4/1990 | Takahashi et al. | |
| 4,991,722 A * | 2/1991 | Hight | 211/59.1 |
| 5,060,897 A * | 10/1991 | Thalenfeld | 248/220.22 |
| 5,806,811 A * | 9/1998 | Viklund et al. | 248/49 |
| 6,161,803 A * | 12/2000 | Daoud | 248/68.1 |
| 6,289,618 B1 * | 9/2001 | Kump et al. | 40/657 |
| 6,460,812 B1 * | 10/2002 | Jette | 248/49 |
| 6,621,714 B1 * | 9/2003 | Li et al. | 361/801 |
| 6,637,704 B2 * | 10/2003 | Jette | 248/49 |
| 7,229,055 B2 * | 6/2007 | Wallther | 248/211 |
| 7,614,817 B2 * | 11/2009 | Nault et al. | 403/293 |
| 8,365,384 B2 * | 2/2013 | Ferris et al. | 29/426.6 |
| 8,366,059 B2 * | 2/2013 | Fannon et al. | 248/74.3 |
| 2010/0186197 A1 | 7/2010 | Inomata et al. | |
| 2010/0219309 A1 * | 9/2010 | Hermann et al. | 248/222.11 |

FOREIGN PATENT DOCUMENTS

| | | |
|---|---|---|
| CN | 2528288 Y | 1/2003 |
| CN | 2633719 Y | 8/2004 |
| CN | 101541594 A | 9/2009 |
| CN | 101702500 A | 5/2010 |
| CN | 201450283 U | 5/2010 |
| CN | 101865331 A | 10/2010 |
| CN | 201781233 U | 3/2011 |
| CN | 202026044 U | 11/2011 |
| FR | 2717554 A1 | 9/1995 |
| GB | 2 092 216 A | 8/1982 |
| JP | 4686382 B2 | 5/2011 |
| KR | 20080022457 A | 3/2008 |

* cited by examiner

CABLE POSITIONING APPARATUS

CROSS-REFERENCE TO RELATED APPLICATIONS

This application is a continuation of International Application No. PCT/CN2012/084680, filed on Nov. 15, 2012, which claims priority to Chinese Patent Application No. 201110361169.6, filed on Nov. 15, 2011, all of which are hereby incorporated by reference in their entireties.

TECHNICAL FIELD

The present invention relates to the communications field, and in particular, to a cable positioning apparatus.

BACKGROUND

Generally, a plurality of modules is deployed in a communication cabinet, and a plurality of cables is connected to each module. The cables within the cabinet need to be limited for quick, efficient and orderly cable arrangement and layout.

At present, the cables in the cabinet are limited generally through a cable tie and a cable binding bridge. During installation, both hands are used to arrange and bind cables in the cabinet. The cable arrangement is specifically as follows: in a cable routing path of the cables in the cabinet, several hollow protrusion parts are designed; during cable arrangement, the cable straps need to be firstly led through a middle position of the protrusion parts and then the cables are arranged and bound using cable ties and fixed to the protrusion parts, and after the binding, the excess of the cable ties is trimmed off. When cable rerouting is required, the original cable straps need to be cut off and discarded, and new cable ties are used to bind the cables.

During implementation of the present invention, the inventors have found that the prior art has at least the following problems: With development of communications technologies, increasing cables are routed for modules whereas a cabinet is required to be in an increasingly small footprint, and therefore, the space for cable routing in the cabinet is increasingly constrained, and the space for manual operations is also increasingly small; during the cable arrangement, fingers need to be bent and apply great force, and an ample space is needed, and therefore, the limited space within the cabinet fails to meet the operation requirements; the cable arrangement procedure is complex and error-prone, and the installation efficiency is low; rough edges caused by trimming-off of the excess of cable ties may slash operators' hands; cable routing is poorly planned, and cables are not run neatly; cables need to be arranged at the cable binding positions, which results in poor operability when the binding positions are too far to reach; cable ties may not be reused, increasing the cabling cost.

SUMMARY

In view of the foregoing defects in the prior art, embodiments of the present invention are intended to provide a cable positioning apparatus which requires a small operation space, and is safe to use and low in cost.

To achieve the foregoing objectives, the present invention provides a cable positioning apparatus, including a base, a snap-fitting apparatus, and a cable clamp; where the base includes a front side, a rear side opposite to the front side, and an end face connecting the front side and the rear side;

the snap-fitting apparatus is arranged on the rear side of the base, and the snap-fitting apparatus includes a lock, where the lock is configured to retract to insert into a corresponding installation hole when external force is applied, and restore, when the external force is removed, to an initial position to be locked into the installation hole; and the cable clamp includes a connection end and a bent free end, and the cable clamp is connected to the end face of the base through the connection end, where an accommodation space is formed between the free end of the cable clamp and the front side of the base to accommodate a cable.

The beneficial effects of technical solutions provided in the embodiments of the present invention are as follows: According to the present invention, an accommodation space is arranged between the base and the cable clamp, elastic deformation of the cable clamp helps push a cable into the accommodation space and limits the cable, and the snap-fitting apparatus arranged on the base fixes the base onto a cabinet. Using the apparatus according to the present invention, a cable is limited without using any other tool, thereby greatly reducing the time spent laying out and positioning a high density of cables; arrangement and binding of cables after being placed into the accommodation space are implemented outside the cabinet for ease of operation; within the cabinet, the snap-fitting apparatus may be fixed to a lateral side of the cabinet using a single hand, and no finger needs to be bent or apply great force to fix the snap-fitting apparatus, thereby imposing a low requirement on the operation space within the cabinet.

DETAILED DESCRIPTION

To make the objectives, technical solutions, and advantages of the present invention more clearly, the following further describes embodiments of the present invention in detail with reference to the accompanying drawings.

Figure 1:
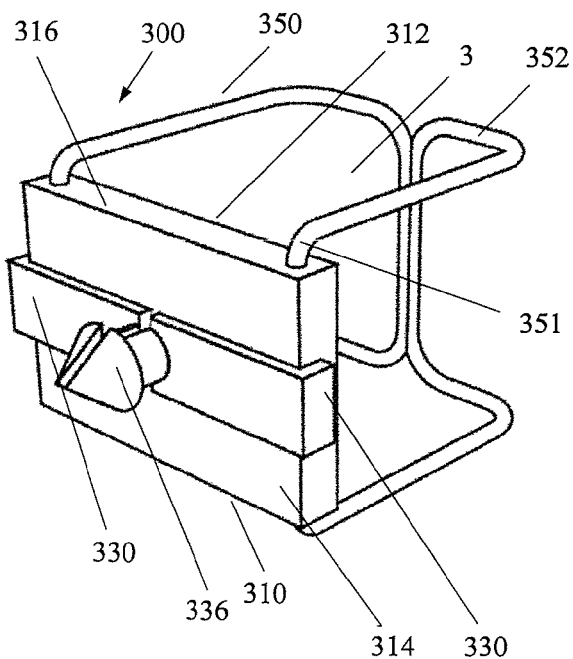
FIG. 1 is a schematic structural diagram of a snap-fitting apparatus of a cable positioning apparatus according to an embodiment of the present invention, where the snap-fitting apparatus is in a free state.
Figure 2:
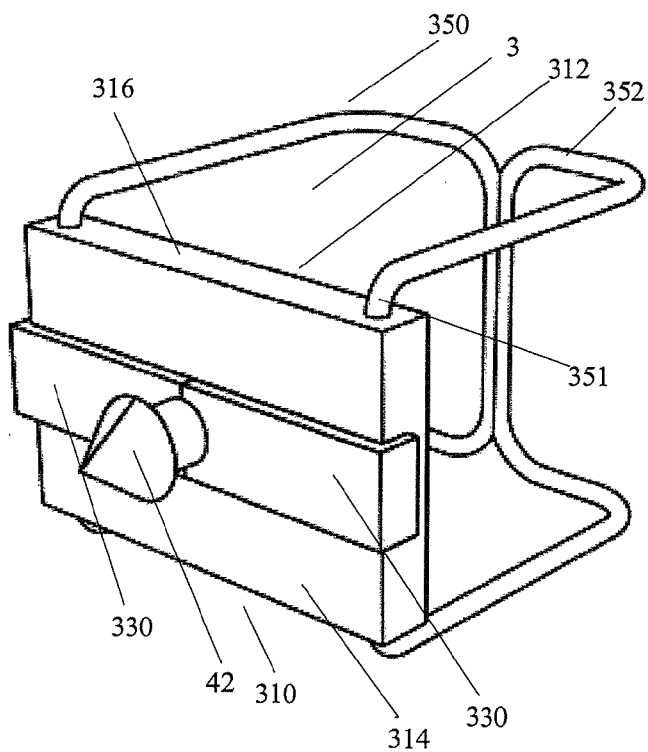
FIG. 2 is a schematic structural diagram of a snap-fitting apparatus of a cable positioning apparatus according to an embodiment of the present invention, where the snap-fitting apparatus is in a closed state.

Referring to FIG. 1 and FIG. 2, a cable positioning apparatus 300 includes a base 310, a snap-fitting apparatus 330, and a cable clamp 350; the base 310 includes a front side 312, a rear side 314 opposite to the front side 312, and an end face 316 connecting the front side 312 and the rear side 314; the snap-fitting apparatus 330 is arranged on the rear side 314 of the base 310, and the snap-fitting apparatus 330 includes a lock 336, where the lock 336 is configured to retract to insert into a corresponding installation hole when external force is applied, and restore, when the external force is removed, to an initial position to be locked into the installation hole; the cable clamp 350 includes a connection end 351 and a bent free end 352, and the cable clamp 350 is connected to the end face 316 of the base 310 through the connection end 351, where an accommodation space 3 is formed between the free end 352 of the cable clamp 350 and the front side 312 of the base 310 to accommodate a cable.

A cabinet in the present invention is provided with a reserved installation hole, the snap-fitting apparatus is used together with the reserved installation hole to fix the base onto the cabinet and fix the cable clamp onto the base, thereby implementing elastic deformation.

The cable clamp in the embodiments of the present invention has an elastic deformation function, and therefore it is convenient to place a cable into the accommodation space, and the cable is limited without using any other tool, thereby greatly reducing the time spent laying out and positioning a high density of cables. A plurality of reserved installation holes may be designed on the cabinet, and an installation position and direction of the cable positioning apparatus may be adjusted according to a cable deployment requirement. For ease of operation, arrangement and binding of a cable after being placed into the accommodation space are implemented outside the cabinet, and the snap-fitting apparatus may be fixed to the reserved installation hole on the cabinet using a single hand, and no finger needs to be bent or apply great force to fix the snap-fitting apparatus, thereby imposing a low requirement on the operation space within the cabinet; the apparatuses in the present invention may be reused, which reduces cabling costs.

For ease of subsequent description of the apparatuses according to the present invention, upper and lower parts of the base are defined as upper and lower sides thereof, a front part of the base 310 is defined as an outer side thereof, a rear part of the base is defined as an inner side thereof, and two sides of the base are defined as left and right sides. For description of spatial arrangement of other parts, reference may be made to the foregoing definitions.

Specifically, referring to FIG. 1, the snap-fitting apparatus 330 includes a body 40, where an outer side of the body 40 is connected to a lock 42 through an elastic apparatus. The elastic apparatus may be a spring. The body 40 includes a first surface and a second surface perpendicularly connected to the first surface, where the first surface of the body 40 may be integrated with the base 310, and the second surface of the body 40 is connected to the lock 42 through a spring. Alternatively, the first surface of the body 40 may be provided independently, and the body 40 may be fixed to the base 310 through a screw.

During implementation of this embodiment, the lock is pushed and then inserted into an installation hole, and under the retraction force of the spring, the lock is snap-fitted on the cabinet near the periphery of the installation hole, thereby completing fixing of the entire base. According to this embodiment, the operation is simple, a cable is limited without using any other tool, and only small space is required for cable layout.

Figure 3:
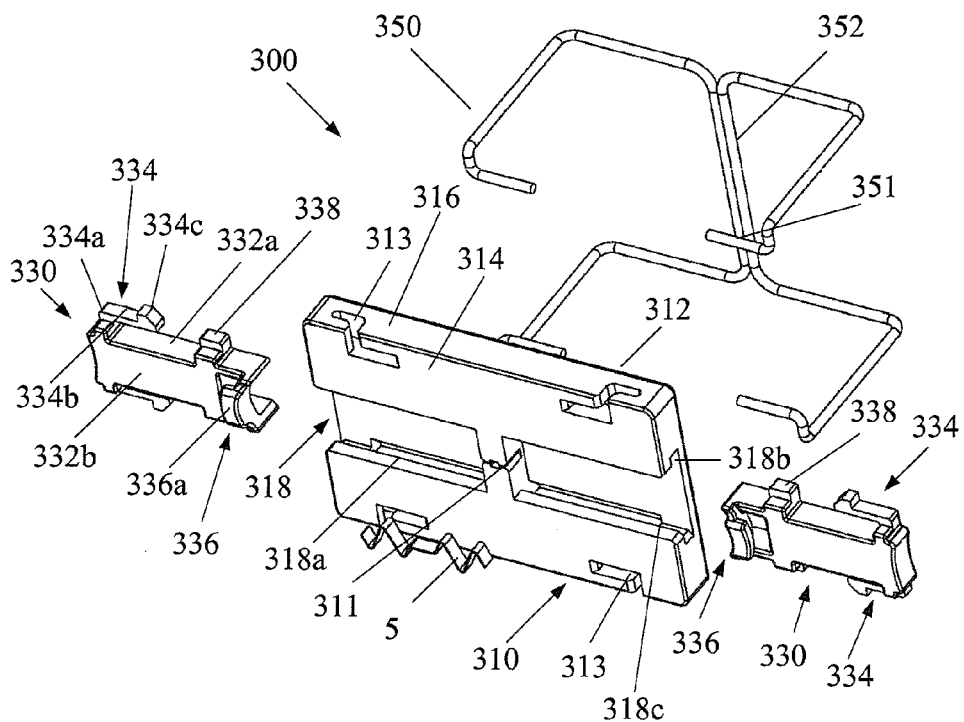
FIG. 3 is a schematic exploded diagram of a cable positioning apparatus according to an embodiment of the present invention.

Referring to FIG. 3, another embodiment of the present invention provides a cable positioning apparatus 300, including a base 310, a snap-fitting apparatus 330, and a cable clamp 350.

The base 310 includes a front side 312, a rear side 314 opposite to the front side 312, and an end face 316 connecting the front side 312 and the rear side 314. In this embodiment, the snap-fitting apparatus 330 is arranged on the rear side 314 of the base. Correspondingly, the rear side 314 of the base 310 is provided with a T-shaped groove 318 extending from a middle position of the rear side 314 to the end face 316, where the T-shaped groove 318 includes a first groove body 318a close to the rear side 314 and a second groove body 318b which is far from the rear side 314 relative to the first groove body 318a. A width of the second groove body 318b along a direction of a long side of the end face 316 is larger than a width of the first groove body 318a. Two bumps 318c are symmetrically formed at a position in which the second groove body 318b of the T-shaped groove 318 is close to the end face 316, where the bumps 318c extend oppositely from two groove walls, which are arranged along the long side of the end face 316 and belong to the second groove body 318b, so that a width of the second groove body 318b at a position close to the end face 316 is smaller than an inner width of the second groove body 318b.

Each snap-fitting apparatus 330 includes a body 332, and a hook 334 and a lock 336 formed on the body 332. In this embodiment, the body 332 includes a first surface 332a and a second surface 332b perpendicularly connected to the first surface 332a. The hook 334 is arranged on the first surface 332a of the body 332, and the hook 334 includes a connection portion 334a connected to an end portion of the first surface 332a of the body 332, a suspension arm portion 334b extending from the connection portion 334a to a middle position of the first surface 332a and at a distance from the first surface 332a, and a locking tab 334c, where the locking tab 334c is formed at a tail end, far from the connection portion 334a, of the suspension arm portion 334b, and extends towards a direction against the first surface 332a. The lock 336 is formed by extending the second surface 332b along a direction parallel to the first surface 332a, and a bolt 336a parallel to the second surface 332b is formed at a tail end of the lock 336.

The locking tab 334c of the hook 334 of each snap-fitting apparatus 330 is snap-fitted to one of the bump 318c, so that each snap-fitting apparatus 330 is securely connected to the base 310; and a spring 5 is arranged between a bottom of each of the T-shaped grooves 318 and the body 332. When the spring 5 is pressed, the body 332 moves towards an opening of each T-shaped groove 318.

Figure 4:
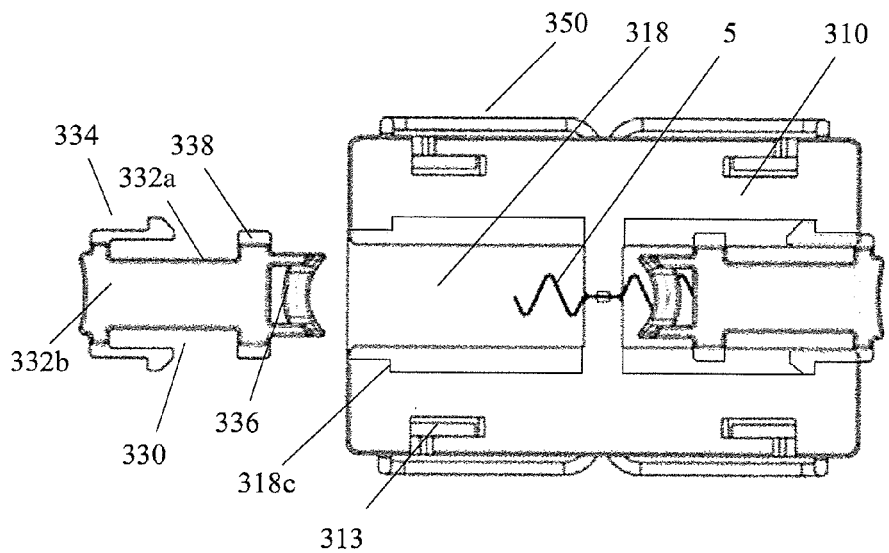
FIG. 4 is a schematic structural diagram of a cable positioning apparatus with a cable accommodated according to an embodiment of the present invention.
Figure 5:
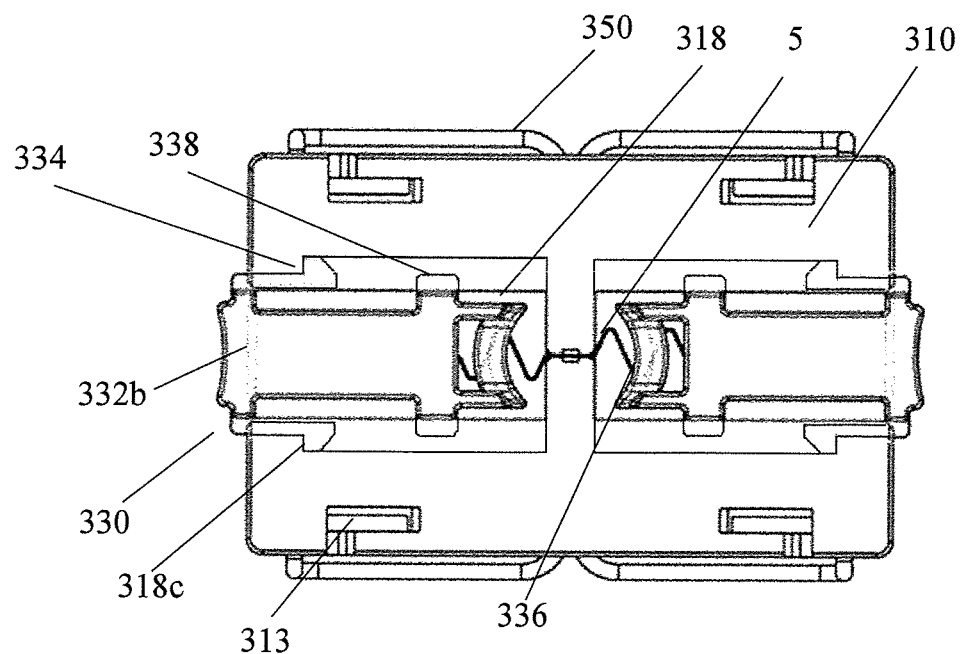
FIG. 5 is a sectional diagram illustrating a process for installing a snap-fitting apparatus of a cable positioning apparatus according to an embodiment of the present invention.

Referring to FIG. 4 and FIG. 5, two snap-fitting apparatus 330 are symmetrically disposed on a base 310. Upper and lower sides of the snap-fitting apparatuses 330 are pinched by fingers with force, so that a hook 334 deforms and enters the T-shaped grooves 318 to enable the snap-fitting apparatuses 330 to slide along the preset T-shaped grooves 318 of the base 310, and to press a spring 5. When the hook 334 of each snap-fitting apparatus 330 slides along the bump 318c, the locking tab 334c of the hook 334 is snap-fitted on the bump 318c under elastic force, preventing the snap-fitting apparatus 330 from being ejected by a pressed spring. After the snap-fitting apparatuses 330 are completely assembled to the T-shaped grooves 318, elastic deformation of the spring 5 pushes one snap-fitting apparatus 300 to be open to the right side of the base 310, and pushes another snap-fitting device 300 to be open to the left side of the base 310. The lock 336 on the outer side of the body 332 is open to the two sides of the base 310 after locking into a reserved installation hole. In this case, a bolt 336a of each lock 336 is snap-fitted on the cabinet, and each lock 336 is in a free state as shown in FIG. 1. According to the present invention, the spring 5 presses the snap-fitting apparatuses 330 such that the base 310 is fixed onto the cabinet. When the base 310 needs to be detached from the cabinet, great force is applied to press the right and left sides of the externally exposed parts of the snap-fitting apparatuses 330, and the spring 5 is tightly pressed again. In this case, each lock 336 is in a state as shown in FIG. 2. Compared with the state shown in FIG. 1, the two locks 336 shown in FIG. 3 are arranged close to each other and in a closed state, and external dimensions of the two locks 336 are both smaller than an diameter of a reserved installation hole. The locks 336 may be detached from a reserved installation hole on the cabinet, and the snap-fitting apparatuses 330 slide out of the T-shaped grooves 318, thereby completing the disassembly. It is convenient to fix the snap-fitting apparatuses in the embodiments of the present invention to the cabinet, and detach the snap-fitting device therefrom.

To enable the base to be more securely fixed onto the cabinet, the rear side 314 of the base 310 is provided with two T-shaped grooves 318. That is, another T-shaped groove is arranged on the other end of one T-shaped groove 318, bottoms of the two T-shaped grooves 318 are arranged in a reverse direction, and a snap-fitting apparatus 330 is disposed in each of the two T-shaped grooves 318.

The two T-shaped grooves 318 may be symmetrically arranged along a longitudinal axis of the base 310. Alternatively, one T-shaped groove 318 may be arranged on the rear side 314 of the base 310, and a corresponding snap-fitting apparatus 330 is arranged.

The snap-fitting apparatuses 330 are symmetrically arranged, and the base 310 is fixed onto the cabinet with force uniformly distributed force applied, thereby enabling more secure fixing.

Referring to FIG. 3, a flange 338 is arranged on an end, far from the hook 334, of the first surface 332a of the body 332, where the flange 338 is embedded into the second groove body 318b (as shown in FIG. 4).

The arranged flange 338 may prevent the snap-fitting apparatuses 330 from swaying upwards, downwards, forwards and backwards, so that the snap-fitting apparatuses 330 slide into the T-shaped grooves 318 and are more securely fixed.

Referring to FIG. 3, there is an opening in a middle position of bottoms of the two T-shaped grooves 318, and a spring 5 is arranged at the opening 12. Two ends of the spring 5 are separately arranged against the body 332 of the snap-fitting device 330.

One spring 5 may be simultaneously used by two snap-fitting apparatuses 330 arranged on two sides, the middle position of the spring may be clamped and held in the opening 12, so that it is convenient to fix the spring 5 and assemble the overall apparatus.

Referring to FIG. 1 and FIG. 2, the lock 336 may be in a mushroom head structure, or in another shape with a larger upper part and a smaller lower part. The recommended structure of the lock 336 is such designed that it is convenient to insert the lock 336 into a reserved installation hole and snap-fitted on the cabinet.

Referring to FIG. 3, each of two end faces 316 of the base 310 is provided with a snap groove 313, connection ends 351 of the cable clamps 350 are snap-fitted on the snap grooves 313 of the base 310, free ends 3502 of the two cable clamps 350 extend opposite to each other, and an accommodation space 3 (as shown in FIG. 1) is formed between the base 310 and the two cable clamps 350. When the free ends 3502 move far away from the rear side 314 of the base 310, closing-intended locking force is produced.

Figure 6:
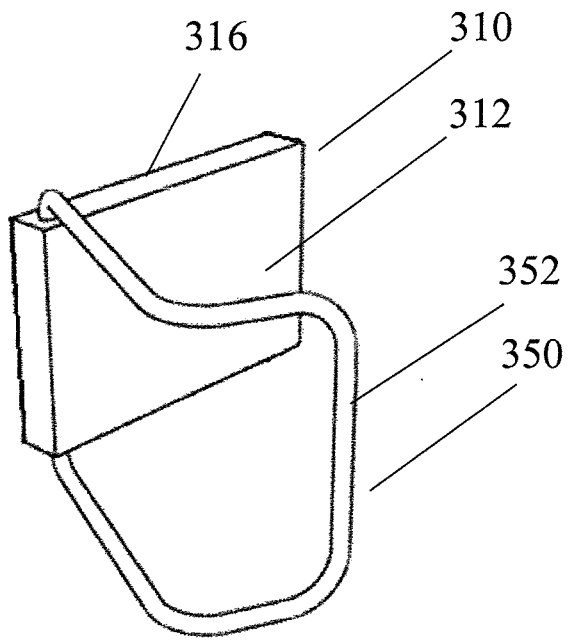
FIG. 6 is another schematic structural diagram of a cable positioning apparatus according to an embodiment of the present invention.

After the connection ends of the cable clamps are snap-fitted into the snap grooves, when the free ends are elevated, the cable clamps produce torque force which enables the free ends to move close to the rear side of the base, thereby implementing clamping of a cable in the accommodation space. Two cable clamps are oppositely arranged on the base, facilitating accommodation of the cable. Alternatively, as shown in FIG. 6, a cable clamp 350 is arranged on only one end of the base 310.

Figure 7:
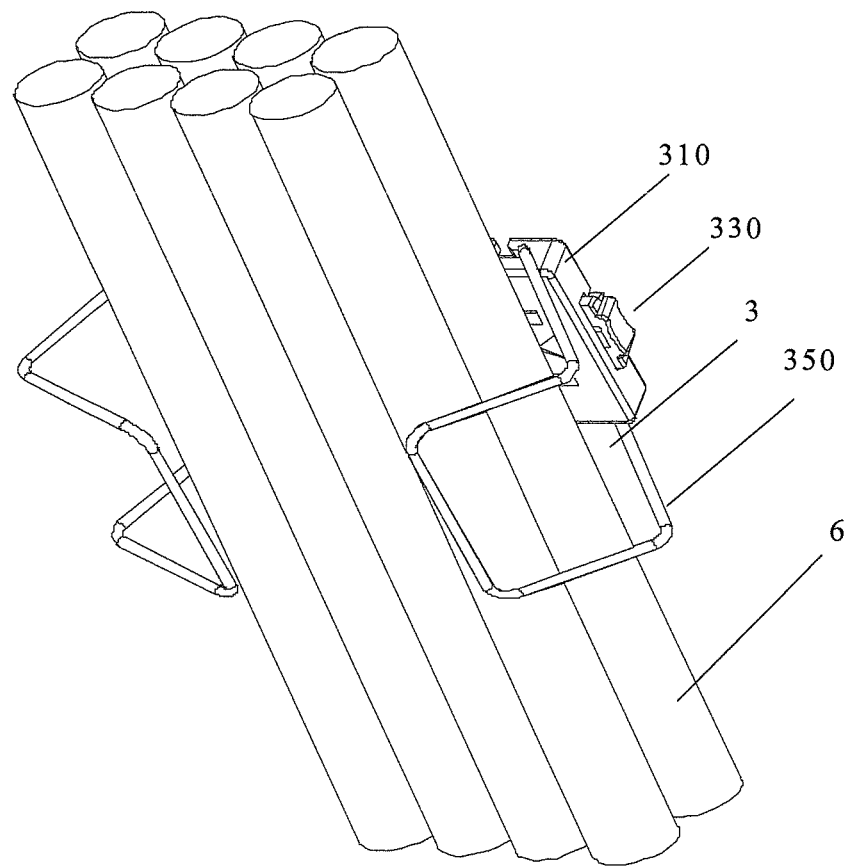
FIG. 7 is a schematic structural diagram of a cable positioning apparatus with a cable snap-fitted according to an embodiment of the present invention.

Referring to FIG. 7, two cable clamps 350 are pulled in opposite direction to become apart from each other. In this case, due to the torque force generated, the cable clamps 350 are subject to elastic deformation, and an opening appears in the closed space between the two cable clamps 350. Cables 6 are placed from the opening into the accommodation space 3. After all the cables 6 are placed, the cable clamps 350, due to the elastic deformation and torque force, close again towards the opening, thereby positioning the cables 6.

Figure 8:
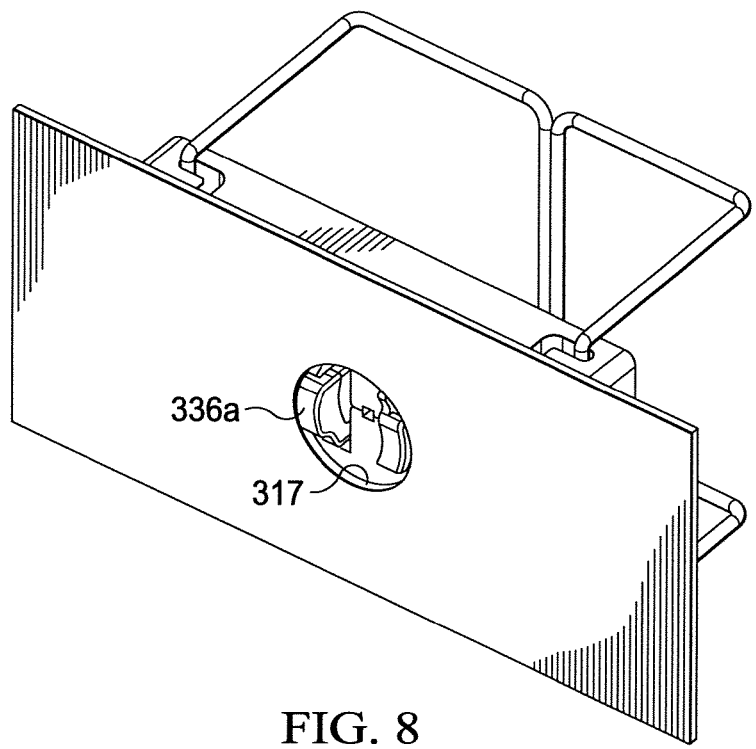
FIG. 8 is a schematic structural diagram of a cable positioning apparatus that illustrates a lock retracting to insert into an installation hole.
Figure 9:
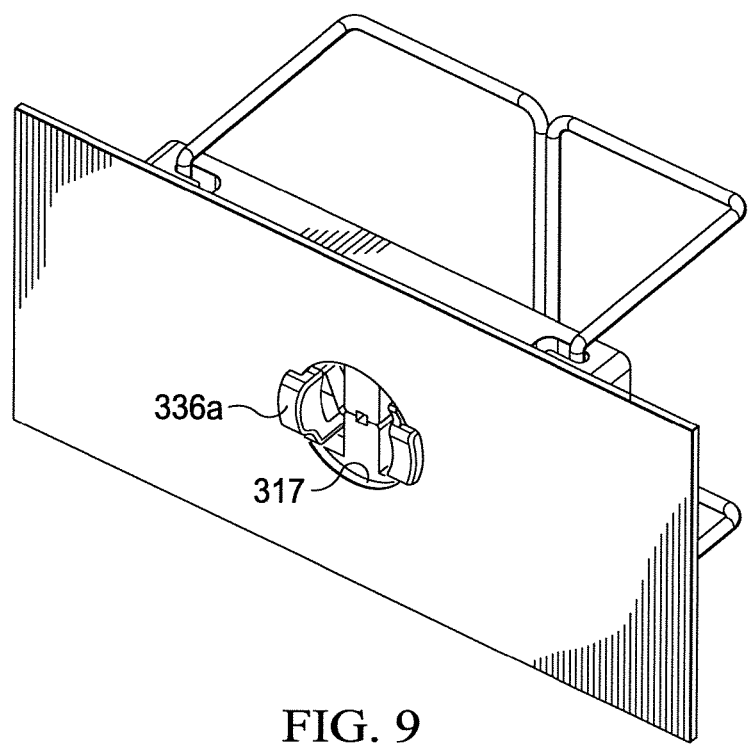
FIG. 9 is a schematic structural diagram of a cable positioning apparatus that illustrates the lock restoring to an initial position to be locked into the installation hole.

FIG. 8 illustrates a lock configured to retract to insert into a corresponding installation hole 317 when external force is applied, and FIG. 9 illustrates the lock restoring, when the external force is removed, to an initial position to be locked into the installation hole 317. For example, referring to FIGS. 3-5 and 8-9, sliding the snap-fitting apparatus 330 along the groove 318 in a direction toward the middle of the base 310 causes the spring 5 to compress, which causes a force to be applied to the lock 336 and the bolt 336a to retract. Once retracted, the bolt 336a can be inserted into the installation hole 317. Thereafter, the snap-fitting apparatus can be slid along the groove 318 in an opposite direction, causing the spring to de-compress, which causes the force to be removed from the lock 336 and the bolt 336a to move to an initial position such that the bolt 336a engages a cabinet near the periphery of the installation hole 317.

Using the apparatuses according to the present invention, a cable is conveniently assembled without using any other tool, and efficiency of cable layout is improved.

Referring to FIG. 3, the embodiments of the present invention employ the following assembly sequence:

1. Embedding the spring 5 in a reserved opening 311 on the back of the base 310.

2. Sliding the snap-fitting apparatuses 330 from reserved T-shaped grooves on the two sides of the base 310 into the base 310, where after reaching a predetermined position, the snap-fitting apparatuses 330 cause elastic compression to the spring 5, and are locked using the hooks 334.

3. Snap-fitting the two free ends of the cable clamp 350 into the reserved installation snap groove 313 on the back of the base 310, and pulling the two free ends towards two sides such that the cable clamps are subject to elastic deformation, and are snap-fitted into the snap grooves 313, and not detached therefrom.

Assembly of the apparatuses in the present invention is achieved in manners of sliding and snap-fitting, without using any other auxiliary tool, and therefore the assembly is simple and convenient. In addition, the apparatuses in the present invention have no sharp corner, and therefore do not cause personal injury.

In conclusion, the foregoing are merely preferred embodiments of the present invention and is not intended to limit the protection scope of the present invention. Variations, replacements, or improvements made without departing from the spirit and principle of the present invention shall fall within the protection scope of the present invention.

What is claimed is:

1. A cable positioning apparatus, comprising a base, at least one snap-fitting apparatus, and a cable clamp; wherein:
the base comprises a front side, a rear side opposite to the front side, and an end face connecting the front side and the rear side, the base further comprising a first groove extending from a middle portion of the rear side to a first end of the rear side;
the at least one snap-fitting apparatus comprising a first snap-fitting apparatus arranged on the rear side of the base, the first snap-fitting apparatus disposed in the first groove and configured to be moveable within the first groove, the first snap-fitting apparatus comprises a lock, wherein the lock is configured to retract to insert into a corresponding installation hole when external force is applied, and restore, when the external force is removed, to an initial position to be locked into the installation hole; and
the cable clamp comprises a connection end and a bent free end, and the cable clamp is connected to the end face of the base through the connection end proximal the first end of the rear side, wherein an accommodation space is formed between the free end of the cable clamp and the front side of the base to accommodate a cable.

2. The cable positioning apparatus according to claim 1, wherein:
the first groove comprises a first T-shaped groove, the first T-shaped groove comprises a first groove body and a second groove body, the first groove body being closer in distance to the rear side than the second groove body, a width of the second groove body along a direction of a long side of the end face is larger than a width of the first groove body; two bumps are symmetrically formed at a position where the second groove body of the first T-shaped groove is proximal the end face, and the bumps extend oppositely from two groove walls, which are arranged along the direction of the long side of the end face and belong to the second groove body, so that a width of the second groove body at a position proximal the end face is smaller than an inner width of the second groove body; and
the first snap-fitting apparatus comprises a body, and a hook and the lock formed on the body; the body comprises a first surface and a second surface, the second surface perpendicular to and connected to the first surface; the hook is arranged on the first surface of the body, and the hook comprises a connection portion connected to an end portion of the first surface of the body, a suspension arm portion extending from the connection portion to a middle position of the first surface and at a distance from the first surface, and a locking tab, wherein the locking tab is formed at a tail end, distal from the connection portion, of the suspension arm portion and extends towards a direction against the first surface; and the lock is formed by extending the second surface along a direction parallel to the first surface, and a bolt parallel to the second surface is formed at a tail end of the lock.

3. The cable positioning apparatus according to claim 2, further comprising a second T-shaped groove, the second T-shaped groove is provided at another end opposite to the first T-shaped groove on the rear side of the base, bottoms of the first and second T-shaped grooves are arranged in opposite directions, and a second snap-fitting apparatus is disposed in the second T-shaped groove.

4. The cable positioning apparatus according to claim 3, wherein:
a flange is arranged at an end, distal from the hook, on the first surface of the body of the first snap-fitting apparatus, and the flange is embedded into the second groove body of the first T-shaped groove.

5. The cable positioning apparatus according to claim 3, wherein an opening is arranged in a middle position on bottoms of the first and second T-shaped grooves to connect the first and second T-shaped grooves, a spring is arranged at the opening, and two ends of the spring are respectively arranged against the body of the first snap-fitting apparatus and a body of the second snap-fitting apparatus.

6. The cable positioning apparatus according to claim 3 wherein the first and second T-shaped grooves are symmetrically arranged on the rear side of the base.

7. The cable positioning apparatus according to claim 1, wherein the end face of the base is provided with a snap groove, the connection end of the cable clamp is snap-fitted into the snap groove, and closing-intended locking force is produced when the free end of the cable clamp moves away from the rear side of the base.

8. The cable positioning apparatus according to claim 1, wherein the cable clamp is arranged at one end of the end face of the base.

9. The cable positioning apparatus according to claim 1, the base further comprising:
a second groove extending from the middle portion of the rear side to a second end of the rear side opposite the first end; and
the at least one snap-fitting apparatus comprising a second snap-fitting apparatus arranged on the rear side of the base, the second snap-fitting apparatus disposed in the second groove and configured to be moveable within the second groove.

10. The cable positioning apparatus according to claim 9, wherein the first groove comprises a first T-shaped groove and the second groove comprises a second T-shaped groove.

11. The cable positioning apparatus according to claim 10, wherein the first T-shaped groove and the second T-shaped groove are symmetrically arranged along a longitudinal axis of the base.

* * * * *